Nov. 12, 1968  W. LANGHEIN ET AL  3,411,044
CURRENT PULSE CIRCUIT
Filed April 27, 1964  2 Sheets-Sheet 1
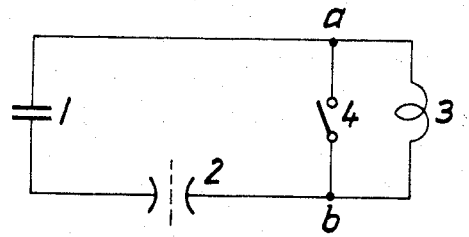
*Fig.1*
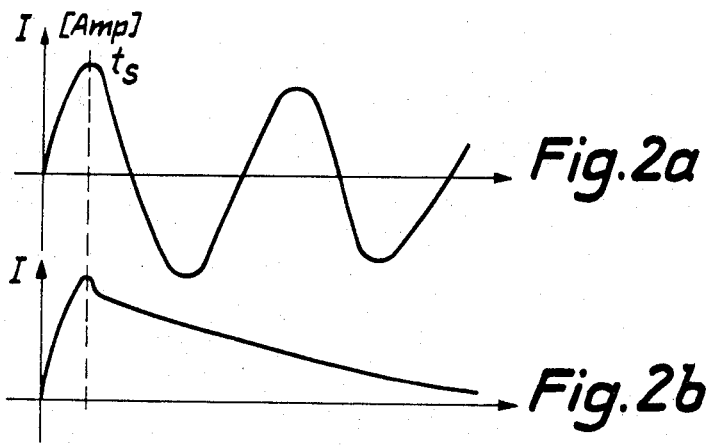
*Fig.2a*
*Fig.2b*
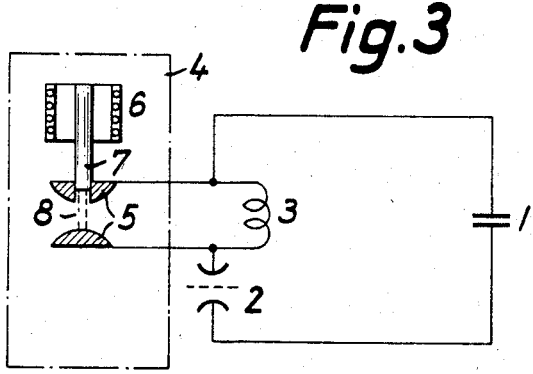
*Fig.3*
Inventors:
Walter Langhein
Andreas von Zorkóczy
By: Spencer & Kaye
ATTORNEYS

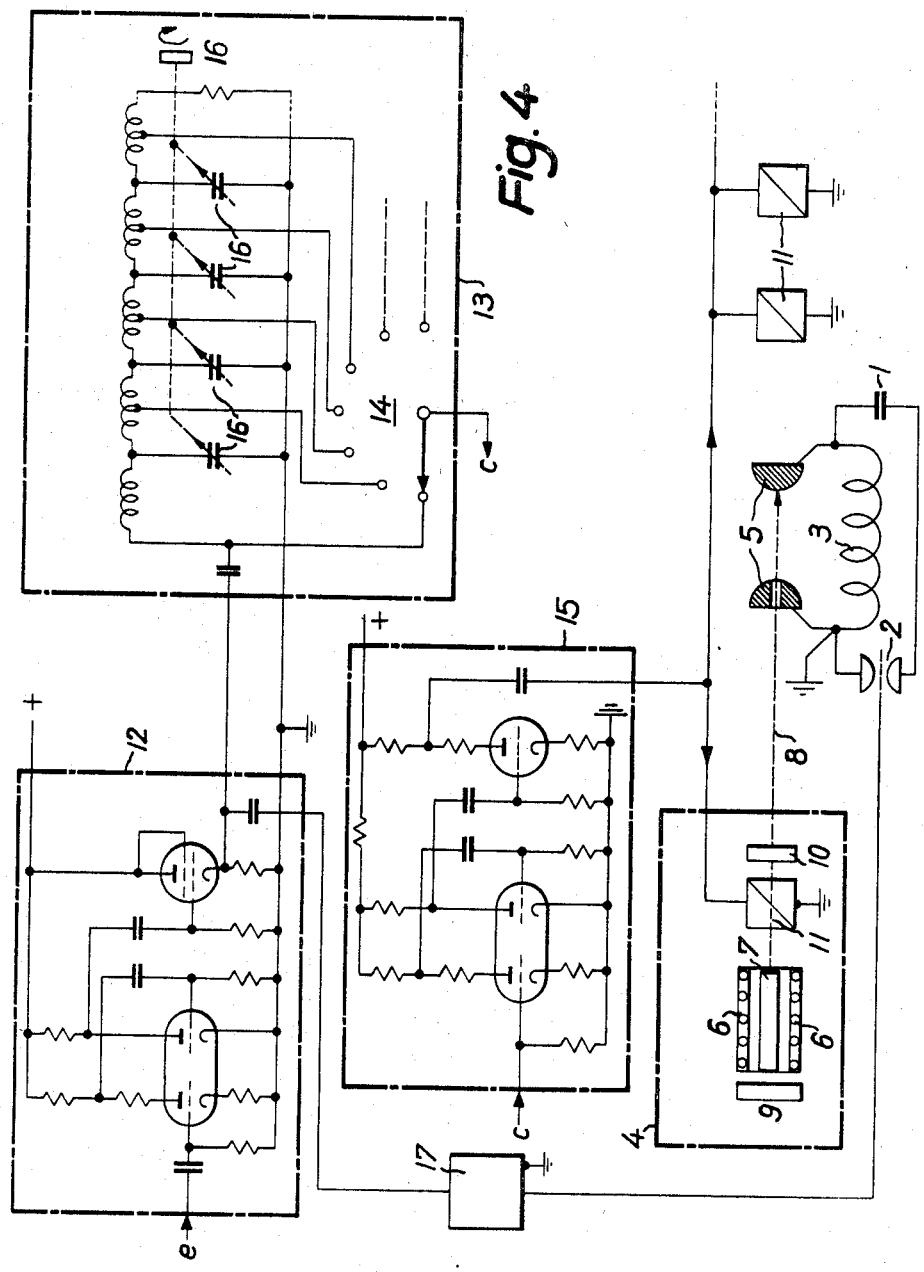

United States Patent Office 3,411,044
Patented Nov. 12, 1968

3,411,044
CURRENT PULSE CIRCUIT
Walter Langhein, Frankfurt am Main, and Andreas Von Zorkoczy, Dreieichenhain u. Langen, Hesse, Germany, assignors to Licentia Patent-Verwaltungs-GmbH, Frankfurt am Main, Germany
Filed Apr. 27, 1964, Ser. No. 362,885
Claims priority, application Germany, Apr. 25, 1963,
L 44,732
8 Claims. (Cl. 317—123)

ABSTRACT OF THE DISCLOSURE

A current pulse circuit having a load and a switch connected in parallel with the load for short-circuiting the same at the instant of maximum excitation. The switch is in the form of two electrodes between which an intensive coherent electromagnetic beam, such as a laser, is directed for producing a plasma discharge, thereby to short-circuit the load.

---

The present invention relates to a current pulse circuit and, more particularly, to a circuit by means of which a load, preferably a coil, can be short-circuited.

Current pulse circuits consist of an energy storing device, e.g., capacitors or coils, a switching organ and a load, all connected in series-circuit. If, for instance, a very strong magnetic field is to be generated, the load is constituted by a coil. When the switching element closes the circuit, the storage device is connected to the load, so that the stored energy then flows to the coil.

FIGURES 1, 2a and 2b will be referred to in order to facilitate an explanation of the problems with which the present invention concerns itself.

FIGURE 1 shows a pulse circuit comprising a storage capacitor 1 which is connected, via a switching organ 2 which, in the illustrated circuit, is constituted by a remote-controlled spark gap, to a coil 3 which produces the magnetic field. This coil may, for example, consist of a single turn. When, upon closing of the switching organ 2, the capacitor 1 is discharged through the load 3, damped oscillations will occur, as is well known. The frequency of these oscillations depends on the capacitance and inductance of the circuit. If, for example, the magnetic field generated by the coil 3 is to be used for producing a high-current ring discharge, the magnetic field must develop in one direction only. As is readily apparent from FIGURE 2a, the circuit can be used throughout only approximately one quarter of the period of the oscillation. But for many purposes, especially in apparatus intended for use in studying the conditions leading to thermonuclear processes, it is essential that the duration of the current be increased. Nonetheless, the slope of the current increase has to be maintained. In order to achieve this, a circuit known as the "crow bar circuit" has been developed the operation of which is such that, at the instant at which the entire energy has been transferred from the capacitor 1 to the coil 3 and in order that the current change, after the elapsed time, has assumed the value 0, the switch 4—see FIGURE 1— connects the points $a$ and $b$. If the switch 4 remains open after the switching organ 2 has been actuated, there is obtained a current vs. time curve as shown in FIGURE 2a. This, as explained above, means that the electromagnetic energy swings back and forth between the capacitor 1 and the coil 3 in the form of a damped oscillation. If, however, the switch 4 is closed at the instant $t_s$ (FIGURE 2b), the current vs. time curve will be as shown in FIGURE 2b, i.e., the current will follow an aperiodic, exponential function whose decay is determined by the characteristics of the coil of the short-circuit as well as the switch 4.

While that which has just been described appears, at first blush, to be quite simple, a number of difficulties have been encountered in reducing the principle to practice. One complicating factor is that the instant at which $t_s$ occurs has to be accurate within approximately $10^{-8}$ seconds. Such extremely high accuracy is simply not possible with mechanical switches. Another complicating factor is that the currents in pulse circuits reach an order of magnitude of about $10^7$ A and higher.

Attempts at solving these problems have led to the use of spontaneous short-circuits, for example, a very precisely fired explosive charge. Other attempted solutions involved the use of gas discharge tubes, such as thyratons and ignitrons. Here there are two difficulties that must be overcome. For one thing, such controlled discharge tubes do not fire unless the voltage reaches a certain value. The switch 4, however, has to close when the voltage across points $a$ and $b$ is zero. The second difficulty is that discharge tubes can not be built to handle high current pulses of the order mentioned above. If, in order to overcome the last-mentioned obstacle, a plurality of discharge tubes are connected in parallel, one immediately is faced with the difficulty that it is not possible to fire all of the parallelly connected tubes exactly simultaneously since the response characteristics of the tubes, even if built to the same specifications, vary over a considerable range so that the above-mentioned accuracy of $10^{-8}$ seconds can not be realized. Accordingly, known gas discharge tubes can not be used for this purpose.

In short, the switch 4 has to meet the following requirements: it has to be open, i.e., have an infinite resistance, at the instant at which the spark gap 2 is closed, which, of course, will be the instant at which the potential across the switch 4 is at a maximum. On the other hand, the switch must close at the instant at which the potential across it has dropped to 0, i.e., when the current reached a maximum.

It is, therefore, the primary object of the present invention to provide a switch which is suitable for use in a current pulse circuit and overcomes the above-described drawbacks. This, according to the present invention, is achieved by short-circuiting the load of a current pulse circuit, such as a coil, at the instant of maximum excitation, by means of a plasma discharge which is fired by an intensive, coherent electromagnetic radiation or beam between two electrodes.

The invention is based on the recognition that when an intensive, coherent electromagnetic beam, particularly a light beam, strikes a metal surface, a plasma discharge is created by means of which a conductive connection is established between this metal surface and another conductive surface arranged opposite the first-mentioned surface. Such a high-intensity light beam may be produced, for example, by means of a so-called laser device.

Additional objects and advantages of the present invention will become apparent upon consideration of the following description when taken in conjunction with the accompanying drawings in which:

FIGURE 1, already referred to above, is a circuit diagram of a pulse circuit.

FIGURE 2a, also referred to above, shows the current vs. time plot of a slowly decaying damped oscillation, as is the case in a pulse circuit according to the prior art.

FIGURE 2b, which was also referred to above, shows the current vs. time plot of an aperiodically exponentially decaying current such as occurs in a circuit incorporating a switch according to the present invention.

FIGURE 3 is a circuit incorporating a switch in accordance with the present invention.

FIGURE 4 is an example of a complete circuit of the present invention.

Referring now to FIGURE 3 of the drawing, the same again shows a capacitor 1 and a switching organ 2, e.g., a spark gap, which, when closed, allows the energy stored in the capacitor to flow through the load, here a coil 3. The switch 4, which is connected in parallel with the load 3 (cf. FIGURE 1), is a switch in accordance with the present invention and comprises two spaced-apart electrodes 5 which, depending on the magnitude of the currents to be handled by the circuit, have a spherical or cylindrical form. The switch 4 further comprises a laser generator which produces a coherent electromagnetic beam such as light beam 8 which fires a plasma discharge between the electrodes 5. In the laser generator, the beam emitting material, e.g., a ruby crystal, is shown at 7 and the high-intensity light source at 6.

The laser is excited, in a manner known per se, shortly before the instant $t_s$ (FIGURE 2b), to put out pulsed beams 8. The plasma discharge ignited by the light beam thus initiates a pre-discharge, which is followed, in an avalanche-like manner, by the increasing total discharge of the coil 3. In contradistinction to other ionized light sources, as for example ultraviolet light, there is, in the arrangement to the present invention, a short circuit between the electrodes 5, this short circuit occurring already before the main discharge. According to the present invention, the spacing between the electrodes 5 is sufficiently great so that the discharge of the storage device 1 by itself does not bring about a firing. If very long single-turn coils 3 are used, it is to advantage if more than one light-emitting arrangement is used. Here it may be necessary to trigger the light-emitting arrangements simultaneously. On the other hand, it can be to advantage if the light-emitting arrangements are triggered at different given times in order to obtain a given current distribution in the load 3. According to the present invention, it is also to advantage to subdivide the electrodes 5 by means of non-conductive heat-proof partition elements such that each sub-electrode is fired separately by means of laser-like sources.

The laser can, by means of conventional circuitry shown in FIGURE 4, be fired with such timing that the pre-discharge of the plasma is ignited with adequate accuracy. It is thus possible to obtain a current flow which, as shown in FIGURE 2b, follows an aperiodic, exponential function.

The laser-arrangement according to the invention consists of the pump lamp 6, the laser (e.g. a ruby) 7, reflector 9 with reflectivity of about 100% and reflector 10 with reflectivity of about 50% and the Kerr-cell 11 to switch the light beam. The device for igniting the laser pulses on time consists of a trigger amplifier 12, a delay network 13 and a power amplifier 15. Furthermore is provided a voltage amplifier 17 to control the proper trigger pulse for the spark gap 2. The mode of operation of the complete device as shown in FIGURE 4 is as follows:

The releasing trigger pulse gets into the preamplifier 12 on point e. At the outlet of the preamplifier is the split point of the intensified pulse. The one branch is coupled to a voltage amplifier 17 and fed to the metal electrode of the spark gap 2. The other branch is coupled to the delay network 13 which consists of some quadripoles containing inductivities and turning capacitors driven by a common spindle. The delay network is closed by a resistor. A various number of quadripoles is tapped off from the delay network by means of the selecting switch 14 and fed to the point c, that is the inlet of the power amplifier 15. The outlet of the power amplifier 15 is coupled with the Kerr-cells 11. Each further complete laser device 4 is equipped with a Kerr-cell 11, according to the above description.

It will be understood that the above description of the present invention is susceptible to various modifications, changes, and adaptations, and the same are intended to be comprehended within the meaning and rage of equivalents of the appended claims.

What is claimed is:

1. In a current pulse circuit having a load, a switch connected in parallel with the load for short-circuiting the same at the instant of maximum excitation, said switch comprising two electrodes and means for directing an intensive coherent electromagnetic beam between said electrodes for producing a plasma discharge, thereby to short-circuit the load.

2. A switch as defined in claim 1 wherein said beam directing means direct the beam against one of said electrodes.

3. A switch as defined in claim 1 wherein said beam directing means direct the beam through one of said electrodes and against the other of said electrodes.

4. A switch as defined in claim 1 wherein said electrodes are spherical.

5. A switch as defined in claim 1 wherein said electrodes are cylindrical.

6. A switch as defined in claim 1 wherein said beam directing means comprise a laser generator, said laser generator including means for producing said beam substantially in synchronism with the instant at which maximum current flows through the load.

7. A current pulse circuit comprising, in combination:
 (a) an energy storage element;
 (b) a load;
 (c) a switching organ;
 (d) means connecting said storage element, said load, and said switching organ in series-circuit with each other; and
 (e) a switch connected in parallel with said load for short-circuiting the same at the instant at which maximum current flows through said load, said switch comprising two electrodes and means for directing an intensive coherent electromagnetic beam between said electrodes for producing a plasma discharge, thereby to short-circuit said load.

8. A current pulse circuit as defined in claim 7 wherein said load comprises a coil.

References Cited

UNITED STATES PATENTS 2,220,551 11/1940 Shimizu et al.
2,405,071 7/1946 Tonks.
3,214,563 10/1965 Ford _____ 219—131 X

OTHER REFERENCES

Lichtman et al.: "Laser Beam Induces Electron Emission," Physical Review Letters, vol. 10, No. 8, 15, April 1963, pp. 342–395.

Anderson: "Condition Via Tracks Ionized by a Laser," IBM Technical Disclosure Bulletin, vol. 5, No. 12, May 1963, pp. 71–72.

LEE T. HIX, *Primary Examiner.*